(12) United States Patent
Magarida et al.

(10) Patent No.: US 9,397,762 B2
(45) Date of Patent: Jul. 19, 2016

(54) WIRELESS COMMUNICATION SYSTEM, DEVICE, AND METHOD FOR DETECTING AND DISTINGUISHING THE MOBILE DEVICE OF A DRIVER AMONG A PLURALITY OF MOBILE DEVICES OF PASSENGERS WITHIN A VEHICLE

(71) Applicants: Naofumi Magarida, Shizuoka-ken (JP); Atsushi Mizutani, Mishima (JP); Yuta Oshiro, Susono (JP)

(72) Inventors: Naofumi Magarida, Shizuoka-ken (JP); Atsushi Mizutani, Mishima (JP); Yuta Oshiro, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 263 days.

(21) Appl. No.: 13/900,054

(22) Filed: May 22, 2013

(65) Prior Publication Data

US 2013/0324051 A1     Dec. 5, 2013

(30) Foreign Application Priority Data

Jun. 1, 2012   (JP) ................................. 2012-125909

(51) Int. Cl.

| H04M 1/60 | (2006.01) |
|---|---|
| H04M 1/725 | (2006.01) |
| H04W 4/02 | (2009.01) |
| H04B 17/00 | (2015.01) |
| H04W 4/04 | (2009.01) |

(52) U.S. Cl.
CPC ............. *H04B 17/00* (2013.01); *H04M 1/6075* (2013.01); *H04M 1/72563* (2013.01); *H04W 4/046* (2013.01); *H04W 4/027* (2013.01)

(58) Field of Classification Search
CPC ................................. H04W 4/04; H04W 4/043
See application file for complete search history.

(56) References Cited

U.S. PATENT DOCUMENTS

| 2009/0191922 | A1* | 7/2009 | Rokusek et al. ............ 455/569.2 |
| 2010/0210212 | A1* | 8/2010 | Sato ............................. 455/41.3 |
| 2011/0105097 | A1* | 5/2011 | Tadayon et al. ................ 455/418 |
| 2011/0153495 | A1* | 6/2011 | Dixon et al. ..................... 705/39 |
| 2011/0223939 | A1* | 9/2011 | Osann, Jr. ................... 455/456.3 |
| 2012/0161927 | A1* | 6/2012 | Pierfelice et al. ............ 340/5.83 |
| 2013/0151111 | A1* | 6/2013 | Skelton .......................... 701/99 |
| 2013/0178234 | A1* | 7/2013 | Jones et al. ................ 455/456.4 |

FOREIGN PATENT DOCUMENTS

| JP | 2011-148425 A | 8/2011 |
| WO | 2013157136 A1 | 10/2013 |

* cited by examiner

*Primary Examiner* — Bobbak Safaipour
*Assistant Examiner* — Devan Sandiford
(74) *Attorney, Agent, or Firm* — Dinsmore & Shohl LLP (57) ABSTRACT

An information identification system includes at least one mobile terminal and an information identification device. The mobile terminal includes: a detection unit configured to detect that the host terminal has been carried into a vehicle cabin; a first notification unit configured to, if the detection unit detects that the host terminal has been carried into the cabin, transmit a first notification signal providing notification that the host terminal has been carried into the cabin; and a second notification unit configured to, if the first notification signal transmitted from another mobile terminal is detected, transmit a second notification signal providing notification that the host terminal has been already present in the cabin. The information identification device includes an identification unit configured to, if the second notification signal is detected, identify the mobile terminal having transmitted the second notification signal as the driver's mobile terminal.

9 Claims, 8 Drawing Sheets

WIRELESS COMMUNICATION SYSTEM, DEVICE, AND METHOD FOR DETECTING AND DISTINGUISHING THE MOBILE DEVICE OF A DRIVER AMONG A PLURALITY OF MOBILE DEVICES OF PASSENGERS WITHIN A VEHICLE

INCORPORATION BY REFERENCE

The disclosure of Japanese Patent Application No. 2012-125909 filed on Jun. 1, 2012 including the specification, drawings and abstract is incorporated herein by reference in its entirety.

BACKGROUND OF THE INVENTION

1. Field of the Invention

The invention relates to an information identification system, an information identification device and an information identification method that identify a mobile terminal owned by a driver from among mobile terminals carried into a vehicle cabin.

2. Description of Related Art

There are known various techniques for determining whether there is a cellular phone carried into a vehicle cabin by utilizing a bidirectional communication function of the cellular phone. In addition, there is also known a technique for determining whether there is an occupant of a vehicle with the use of a sensor provided at a door of the vehicle or a seat in a vehicle cabin.

For example, Japanese Patent Application Publication No. 2011-148425 (JP 2011-148425 A) describes a configuration that includes: a driver detection sensor that detects a driver through image processing or fingerprint authentication; an occupant detection sensor that detects an occupant that is seated on a seat of a vehicle; and a cellular phone detection sensor that detects a radio wave that is emitted from a cellular phone carried into a vehicle cabin. In addition, there is also described an information association device that is configured to detect that a cellular phone has been carried in the vehicle cabin through signals transmitted from the occupant detection sensor and the cellular phone detection sensor.

However, in the device described in JP 2011-148425 A, when a radio wave is not emitted from a cellular phone, the cellular phone is not detected by the cellular phone detection sensor, and a cellular phone may not be detected although the cellular phone has been carried in the vehicle cabin. Therefore, when the number of cellular phones carried in the vehicle cabin is not accurately recognized, association may be erroneously established.

SUMMARY OF THE INVENTION

The invention provides an information identification system, an information identification device and an information identification method that are configured to be able to further accurately recognize a mobile terminal in a vehicle cabin by further reliably causing the mobile terminal carried into the vehicle cabin to transmit a communication signal.

A first aspect of the invention provides an information identification system. The information identification system includes: at least one mobile terminal including: a detection unit configured to detect that the host terminal has been carried into a vehicle cabin; a first notification unit configured to, when the detection unit has detected that the host terminal has been carried into the vehicle cabin, transmit a first notification signal that provides notification that the host terminal has been carried into the vehicle cabin; and a second notification unit configured to, when the first notification signal transmitted from another mobile terminal has been detected, transmit a second notification signal that provides notification that the host terminal has been already present in the vehicle cabin; and an information identification device including an identification unit configured to wirelessly communicate with the at least one mobile terminal and to, when the second notification signal has been detected, identify the mobile terminal that has transmitted the detected second notification signal as the driver's mobile terminal.

A second aspect of the invention provides an information identification device. The information identification device includes: a communication unit configured to wirelessly communicate with at least one mobile terminal, the at least one mobile terminal being configured to transmit a first notification signal that provides notification that the host terminal has been carried into a vehicle cabin and to, if the first notification signal transmitted from another mobile terminal is detected, transmit a second notification signal that provides notification that the host terminal has been already present in the vehicle cabin; and an identification unit configured to, if the second notification signal is detected via the communication unit, identify the mobile terminal that has transmitted the detected second notification signal as the driver's mobile terminal.

A third aspect of the invention provides an information identification method used in an information identification system including at least one mobile terminal configured to detect that the host terminal has been carried into a vehicle cabin and an information identification device configured to wirelessly communicate with the at least one mobile terminal. The information identification method includes: transmitting, through the at least one mobile terminal, a first notification signal that provides notification that the host terminal has been carried into the vehicle cabin; if the first notification signal transmitted from another mobile terminal is detected, transmitting, through the at least one mobile terminal, a second notification signal that provides notification that the host terminal has been already present in the vehicle cabin; and if the second notification signal is detected, identifying the mobile terminal that has transmitted the detected second notification signal as the driver's mobile terminal

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The invention will now be described by way of embodiments. An information identification system according to the invention is configured to identify a mobile terminal of a driver by detecting a signal transmitted from a mobile terminal carried into a vehicle cabin with the use of an information identification device. Specifically, the mobile terminal is configured to detect that the mobile host terminal (host terminal) has been carried into the vehicle cabin by detecting a positional change of the host terminal based on boarding action of an occupant that carries the host terminal. In addition, the mobile terminal is configured to transmit a communication signal (first notification signal) that provides notification that the host terminal has been carried into the vehicle cabin. Furthermore, the mobile terminal is configured to detect the first notification signal transmitted from another mobile terminal carried into the vehicle cabin, and is configured to transmit a communication signal (second notification signal) different from the first notification signal if the mobile terminal detects the first notification signal transmitted from the other mobile terminal. That is, the mobile terminal according to the invention is configured to detect movement of the host terminal, and is configured to actively transmit the first notification signal on the basis of the detection of the movement. In addition to this, the mobile terminal is configured to passively transmit the second notification signal on the basis of detection of the first notification signal transmitted from another mobile terminal. Thus, the information identification device is configured to identify driver's mobile terminal from among mobile terminals in the vehicle by detecting a communication signal (a first notification signal or a second notification signal) transmitted as described above from a mobile terminal carried into the vehicle.

Figure 1:
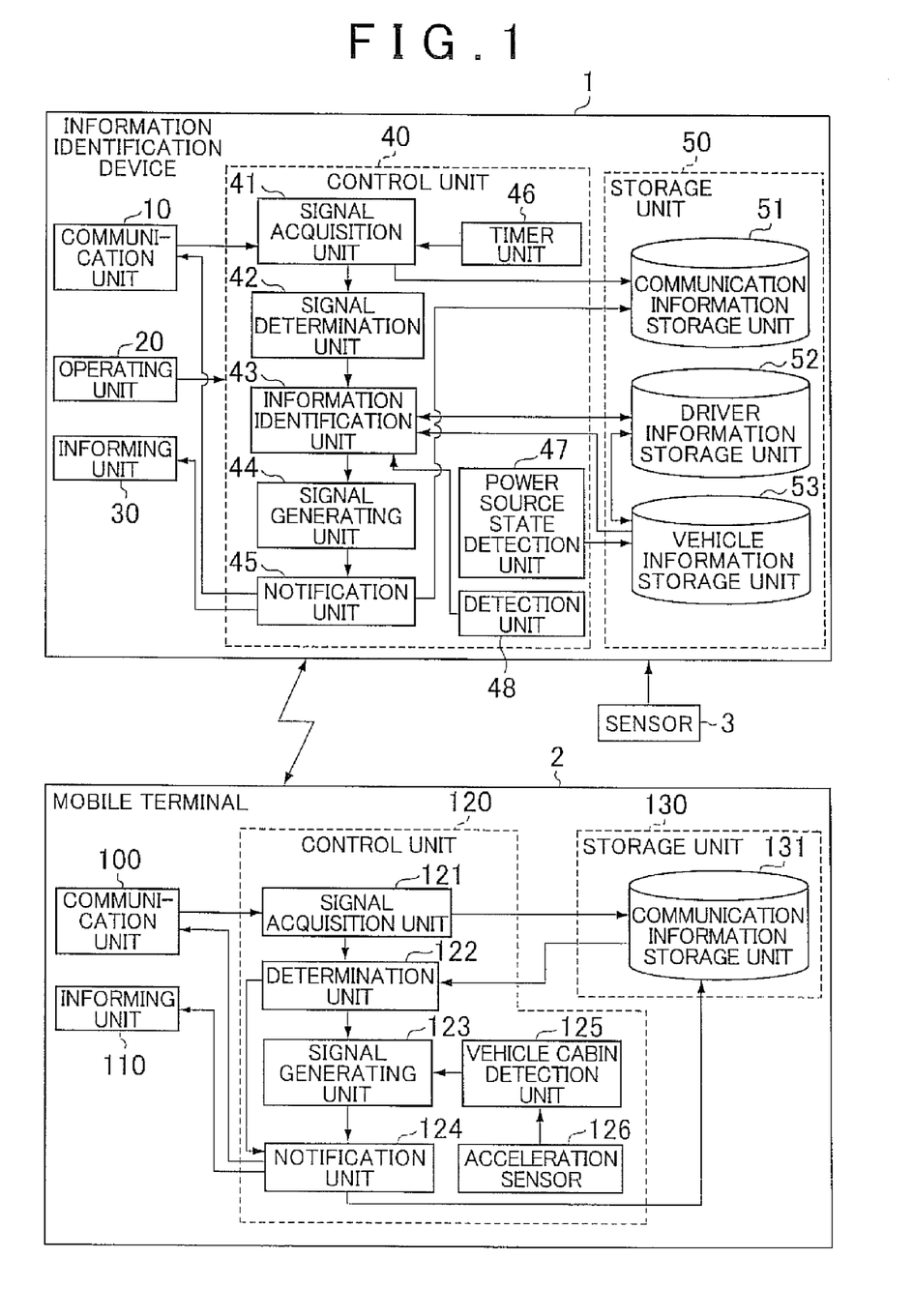
FIG. 1 is a view that schematically shows functional blocks that constitute an information identification system according to a first embodiment of the invention.

Hereinafter, an information identification system according to a first embodiment of the invention will be described with reference to the accompanying drawings. FIG. 1 is a view that schematically shows functional blocks that are provided in an information identification device 1 and a mobile terminal 2. The information identification device 1 and the mobile terminal 2 are included in the information identification system according to the first embodiment. In the information identification system, the information identification device 1 and the mobile terminal 2 are configured to wirelessly communicate with each other, and the information identification device 1 is configured to receive a signal from an on-board sensor 3. The information identification device 1 may be a device mounted on a vehicle or may be a device installed outside the vehicle. In addition, the mobile terminal 2 illustrated in FIG. 1 is a mobile terminal carried into the vehicle (vehicle cabin). In FIG. 1, only one mobile terminal 2 is illustrated; however, the information identification system according to the first embodiment may include a plurality of the mobile terminals 2.

The information identification device 1 includes an arithmetic processing unit (CPU). The CPU of the information identification device 1 is configured to control a storage device (RAM, ROM, or the like) or external storage device (HDD, or the like), which stores CPU-executable computer programs and various data, and execute information processing through execution of the computer programs. Therefore, the information identification device 1 includes the functional blocks illustrated in FIG. 1. Specifically, the information identification device 1 includes a communication unit 10, an operating unit 20, an informing unit 30, a control unit 40 and a storage unit 50.

The communication unit 10 transmits or receives information at the time when the information identification device 1 wirelessly communicates with the mobile terminal 2. That is, the communication unit 10 includes a wireless communication antenna that serves as a transmitting-receiving unit and a control unit that controls wireless communication. Thus, the information identification device 1 is configured to detect, via the communication unit 10, a communication signal transmitted from the mobile terminal 2 and to transmit a communication signal generated by a signal generating unit 44 (described later).

The operating unit 20 is provided in the vehicle cabin and is operated by an occupant of the vehicle. For example, a main switch unit to which a key is inserted, a start-stop switch of a hybrid system in a hybrid vehicle, a start-stop switch of a power source in an electric vehicle, or the like, is used as the operating unit 20. In addition, a touch panel that is operated by an occupant through touching a screen of a display unit in the vehicle cabin on the basis of image data displayed on the display unit is also included as the operating unit 20. That is, the operating unit 20 serves as an input unit in the information identification device 1.

The informing unit 30 is provided in the vehicle cabin, and informs an occupant in the vehicle cabin of the state of the vehicle or various pieces of information. For example, the display unit that displays image data so that the occupant in the vehicle cabin is able to visually recognize information, a speaker provided in the vehicle cabin, or the like, is used as the informing unit 30. That is, the informing unit 30 serves as an output unit in the information identification device 1. For example, a touch panel may be employed as a configuration that has both the function of the operating unit 20 and the function of the informing unit 30 for displaying information based on image data and accepting occupant's operation.

The storage unit 50 includes a communication information storage unit 51, a driver information storage unit 52 and a vehicle information storage unit 53. The communication information storage unit 51 stores communication information that includes information about the history of communication carried out via the communication unit 10. Specifically, reception data and transmission data in wireless communication are stored in the communication information storage unit 51. In addition, communication information that is stored in the communication information storage unit 51 includes a communication date and time and the type of transmitted or received communication signal.

The driver information storage unit 52 stores driver information that includes information about the mobile terminal 2 identified as driver's mobile terminal. The driver information includes the identification information of the mobile terminal 2, a date and time at which the mobile terminal 2 is identified as the driver's mobile terminal, and a driver flag for identifying a current driver. For example, information about the mobile terminal 2 identified as the driver's mobile terminal is stored in a current driver field within the data structure of the driver information storage unit 52 as driver information for which the driver flag is set. In the following description, a state where the driver flag is set may be described as a state where the driver flag is on.

The vehicle information storage unit 53 stores information about the vehicle. For example, as will be described in detail later, information based on a signal input from the sensor 3 to the information identification device 1 is stored in the vehicle information storage unit 53. Specifically, information detected by a detection unit 48 that detects the signal input from the sensor 3 and information detected by a power source state detection unit 47 that detects a start or stop of a power source are stored as vehicle information. Furthermore, travel history information, such as a travel distance and a driving characteristic, may be stored in the vehicle information storage unit 53. In a state where the current driver is identified, it may be configured such that the information stored in the driver information storage unit 52 may be associated with the information stored in the vehicle information storage unit 53. In this case, the driver information in which the driver flag is on is associated with the vehicle information acquired while the driver flag is on.

The control unit 40 includes a signal acquisition unit 41, a signal determination unit 42, an information identification unit 43, the signal generating unit 44, a notification unit 45, a timer unit 46, a power source state detection unit 47 and the detection unit 48. The signal acquisition unit 41 acquires the communication signal, transmitted from the mobile terminal 2, via the communication unit 10. That is, the signal acquisition unit 41 is configured to receive the communication signal transmitted from the mobile terminal 2. For example, a carry-on notification signal that notifies that the mobile terminal 2 has been carried into the vehicle cabin and a priority signal that notifies that the mobile terminal 2 has been already present in the vehicle cabin are acquired by the signal acquisition unit 41. Then, information about the communication signal acquired by the signal acquisition unit 41 is stored in the communication information storage unit 51, and is output from the signal acquisition unit 41 to the signal determination unit 42.

The signal determination unit 42 executes determination processing on the communication signal. Specifically, the signal determination unit 42 is configured to determine whether the information identification device 1 detects the communication signal transmitted from the mobile terminal 2. In addition, the signal determination unit 42 is configured to determine the type of the detected communication signal, that is, the communication signal acquired by the signal acquisition unit 41. For example, the signal determination unit 42 is configured to determine whether the detected communication signal is the carry-on notification signal, the priority signal, or the like, and is configured to determine whether there are a plurality of the detected communication signals. Then, information determined by the signal determination unit 42 is output to the information identification unit 43.

The information identification unit 43 identifies the driver's mobile terminal on the basis of the information as to whether the communication signal is detected and the information about the detected communication signal. For example, when the detected communication signals all are only the carry-on notification signals, the information identification unit 43 is configured to identify the driver's mobile terminal from among the mobile terminals 2 that have transmitted the carry-on notification signals. In this way, at the time of identifying the driver's mobile terminal using the carry-on notification signal, the information identification unit 43 is configured to identify the driver's mobile terminal on the basis of the carry-on notification signals and a sensor signal input from the sensor 3, such as a pressure signal that is input from a pressure sensor provided at a driver seat and a door signal that is input from an open/close sensor that detects opening and closing of a vehicle door. As an example, the information identification unit 43 is configured to identify the driver's mobile terminal on the basis of an interval between time at which the sensor signal is detected and time at which the carry-on notification signal is detected. Then, information about the mobile terminal 2 identified by the information identification unit 43 is stored in the driver information storage unit 52 as current driver information. That is, the information identification unit 43 is configured to associate the driver information with the vehicle information.

The information identification unit 43 is configured to identify the driver' mobile terminal on the basis of information that is stored in the driver information storage unit 52. For example, when information about the mobile terminal 2 that has transmitted the carry-on notification signal is stored in the driver information storage unit 52 as the driver's mobile terminal in the past, the information identification unit 43 is configured to identify the driver's mobile terminal on the basis of history information, such as the number of times the mobile terminal 2 has been identified as the driver's mobile terminal. In other words, in this case, the information identification unit 43 is configured to keep an association state in which the driver information and the vehicle information are associated with each other.

In addition, when detected communication signals include the carry-on notification signal and the priority signal, the information identification unit 43 is configured to give a priority to the priority signal over the carry-on notification signal and to identify the mobile terminal 2 that has transmitted the priority signal as the driver's mobile terminal. In this way, at the time of identifying the driver's mobile terminal on the basis of the priority signal, the information identification unit 43 causes the driver information storage unit 52 to keep the stored driver flag. That is, the state where the mobile terminal 2 is identified as the driver's mobile terminal in the last identification processing is kept.

Furthermore, the information identification unit 43 identifies the driver's mobile terminal on the basis of information about what communication signal is detected or no communication signal is detected in a state where the driver information and the vehicle information are associated with each other. Specifically, in a state where the driver information and the vehicle information are associated with each other, when neither the carry-on notification signal nor the priority signal is detected, the information identification unit 43 is configured to identify the driver's mobile terminal on the basis of the information detected by the power source state detection unit 47. For example, the information identification unit 43 is configured to identify the driver's mobile terminal on the basis of an elapsed time from time at which the power source has been stopped and to determine whether to keep the result of the last identification processing in the current identification processing. Then, information based on the fact that the driver's mobile terminal has been identified by the information identification unit 43 is input to the signal generating unit 44. Irrespective of the type of vehicle and the type of power source, a stop of the power source described here indicates a so-called ignition off action or state. That is, in the power source stop state, a vehicle system is completely stopped.

The signal generating unit 44 generates a signal that is transmitted from the information identification device 1. Specifically, the type of signal that is generated by the signal generating unit 44 differs on the basis of information that is input from the information identification unit 43. For example, a communication signal that is transmitted toward the mobile terminal 2, such as a communication signal that notifies that the mobile terminal 2 has been identified as the driver's mobile terminal, a confirmation signal that requires the mobile terminal 2 to respond, a communication signal that is transmitted toward the mobile terminal 2, and a reset signal that notifies that an association state is cancelled, are generated by the signal generating unit 44. In addition, the signal generating unit 44 is configured to generate a signal that is output to the informing unit 30. Then, information about the signal generated by the signal generating unit 44 is output to the notification unit 45.

The notification unit 45 provides notification that the driver's mobile terminal is identified to the mobile terminal 2. In addition, the notification unit 45 notifies an occupant of the vehicle of information that the driver's mobile terminal has been identified. That is, information that the driver's mobile terminal has been identified is output to the informing unit 30 by the notification unit 45. In addition, information about a notification history that indicates that information has been notified by the notification unit 45 is stored in the communication information storage unit 51.

The timer unit 46 measures an elapsed time from when the signal acquisition unit 41 starts accepting a communication signal. The signal acquisition unit 41 is configured to end accepting a communication signal when a period of time measured by the timer unit 46 exceeds a predetermined period of time.

The power source state detection unit 47 detects the fact that the power source of the vehicle shifts from a driven state to a stopped state. For example, in the case of the vehicle that uses an internal combustion engine as the power source, the power source state detection unit 47 is configured to detect the fact that the internal combustion engine shifts from a driven state to a stopped state. In addition, in the vehicle configured to start or stop the power source by turning a key inserted in the main switch unit, the power source state detection unit 47 may detect rotation of the key inserted in the main switch unit. Furthermore, the power source state detection unit 47 may be applied to a vehicle configured to detect a communication device carried into a vehicle cabin and to detect the fact that the operating unit 20 for starting or stopping the power source is operated without inserting a key to a main switch unit.

The mobile terminal 2 is a mobile terminal that can be taken by a user, such as a cellular phone, a smartphone, a tablet computer and a personal digital assistant (PDA), and is a communication terminal that is able to wirelessly communicate with another device. Specifically, the mobile terminal 2 includes an arithmetic processing unit and a storage device, and is configured such that the arithmetic processing unit controls the storage device and executes information processing in accordance with a computer program. Specifically, the mobile terminal 2 includes a communication unit 100, an informing unit 110, a control unit 120 and a storage unit 130.

The communication unit 100 is used at the time when the mobile terminal 2 wirelessly communicates with the information identification device 1. Specifically, the communication unit 100 includes a wireless communication antenna and a control unit that controls the wireless communication. That is, the mobile terminal 2 is configured to receive a communication signal, transmitted from a mobile terminal 2, and to transmit a communication signal generated by a signal generating unit 123 via the communication unit 100 (described later).

The informing unit 110 is a display unit that displays image data so that the user of the mobile terminal 2 is able to visually recognize information, a speaker that outputs sound data, or the like. The informing unit 110 may be configured to have both the function of the operating unit and the function of the informing unit 110 as, for example, a touch panel that displays information based on image data and accepts user's operation of the touch panel.

The storage unit 130 is configured to include at least the communication information storage unit 131. The communication information storage unit 131 stores information about the history of communication carried out by the mobile terminal 2 with another device. For example, transmission history information that includes a history that the mobile terminal 2 has transmitted the carry-on notification signal and a history that the mobile terminal 2 has transmitted the priority signal is stored in the communication information storage unit 131. Furthermore, information about a history that the mobile terminal 2 has detected a communication signal transmitted from another device is stored in the communication information storage unit 131. Specifically, reception history information, such as a history that the carry-on notification signal transmitted from another mobile terminal 2 has been detected, a history that the confirmation signal transmitted from the information identification device 1 has been detected and a history that the reset signal has been detected, is stored in the communication information storage unit 131. In addition, communication information that is stored in the communication information storage unit 131 includes transmission/reception time of a signal transmitted or received. It may be configured such that, when a signal, which indicates that the mobile terminal 2 has been identified as the driver's mobile terminal, is received from the information identification device 1, history information that the signal has been received is stored in the communication information storage unit 131.

The control unit 120 includes a signal acquisition unit 121, a determination unit 122, the signal generating unit 123, a notification unit 124, a vehicle cabin detection unit 125 and an acceleration sensor 126. The acceleration sensor 126 detects an acceleration that is a time rate of change in velocity, that is, a change in velocity per unit time. The acceleration sensor 126 is configured to be able to detect application of external force, and is configured to be able to detect inclination, vibrations, movement, impact, drop, and the like, in addition to acceleration. For example, the acceleration sensor 126 is configured to detect movement of the mobile terminal 2 on the basis of a variation in acceleration that is generated through the motion of the mobile terminal 2 that includes the acceleration sensor 126. In addition, the acceleration sensor 126 is configured to detect occurrence of a large acceleration in an extremely short period of time, that is, an acceleration that occurs due to an impact. In addition, the acceleration sensor 126 is configured to output an output signal by detecting an acceleration. The acceleration sensor 126 just needs to be a small and light sensor that is mountable on the mobile terminal 2. In addition, in the acceleration sensor 126 according to the invention, a sensing type, such as an electrostatic type and a piezoelectric type, a manufacturing technique, such as whether to employ a microelectromechanical systems (MEMS), a sensing amount, such as the direction of an acceleration (a single-axis and a multiple-axis), the magnitude of an acceleration and a frequency band width, and the like, are not specifically limited.

The signal acquisition unit 121 detects a signal transmitted from the information identification device 1 or a communication signal transmitted from the other mobile terminal 2. That is, the signal acquisition unit 121 acquires information about a communication signal transmitted from another device through wireless communication. In addition, the signal acquisition unit 121 outputs information about the acquired communication signal to the determination unit 122, and stores the information about the acquired communication signal in the communication information storage unit 131.

The determination unit 122 determines the type of communication signal acquired by the signal acquisition unit 121. Specifically, the determination unit 122 is configured to determine whether the acquired communication signal is a confirmation signal transmitted from the information identification device 1 or a carry-on notification signal transmitted from the other mobile terminal 2. That is, the determination unit 122 is configured to determine the type of detected communication signal. In addition, the determination unit 122 determines whether information about a communication history relating to the communication signal is stored in the communication information storage unit 131 on the basis of the detected communication signal. For example, when the carry-on notification signal from the other mobile terminal 2 is detected, the determination unit 122 is configured to determine whether the mobile terminal 2 has transmitted the carry-on notification signal in the current processing. Alternatively, when the confirmation signal from the information identification device 1 is detected, the determination unit 122 is configured to determine whether the mobile terminal 2 has transmitted the carry-on notification signal in the current processing.

The signal generating unit 123 generates a communication signal that is transmitted from the mobile terminal 2 through wireless communication on the basis of the result of information processing executed by the determination unit 122 and the vehicle cabin detection unit 125 (described later). Specifically, the signal generating unit 123 is configured to generate the carry-on notification signal on the basis of information that is input from the vehicle cabin detection unit 125 and to generate the priority signal on the basis of information that is input from the determination unit 122. In addition, information about the communication signal generated by the signal generating unit 123 is output to the notification unit 124.

The notification unit 124 notifies the communication signal generated by the signal generating unit 123 to another device. In addition, the notification unit 124 outputs information to the informing unit 110 of the mobile terminal 2, and notifies the information to the user of the mobile terminal 2. That is, the information is output from the notification unit 124 to the communication unit 100, and the information about the wireless communication is stored in the communication information storage unit 131 via the notification unit 124.

The vehicle cabin detection unit 125 detects the fact that the mobile terminal 2 has been carried into the vehicle cabin. Specifically, the vehicle cabin detection unit 125 is configured to detect the fact that the mobile terminal has been carried into the vehicle cabin on the basis of a signal output as a result of detection of an acceleration by the acceleration sensor 126. In other words, with the use of the acceleration sensor 126 and the vehicle cabin detection unit 125, the mobile terminal 2 is configured to actively detect that the host terminal has been carried into the vehicle cabin.

The sensor 3 is a sensor mounted on the vehicle, and is configured to output a signal to the information identification device 1. The sensor 3 includes a pressure sensor that is provided at a driver seat of the vehicle and detects that the driver has been seated on the driver seat and an open/close sensor that detects opening and closing of a vehicle door.

Figure 2:
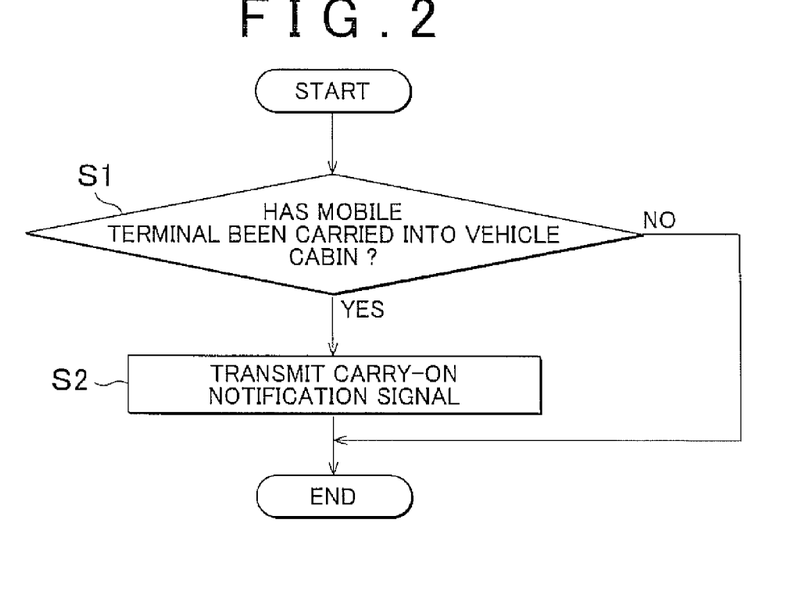
FIG. 2 is a flowchart that shows an example of information processing that is executed at the time when a mobile terminal has been carried into a vehicle cabin.

Next, information processing that is executed by the mobile terminal 2 at the time when the mobile terminal 2 has been carried into the vehicle cabin of the vehicle will be described with reference to FIG. 2. FIG. 2 is a flowchart that shows an example of information processing at the time when the mobile terminal 2 has been carried into the vehicle cabin. The vehicle cabin detection unit 125 of the mobile terminal 2 determines whether the mobile terminal 2 has been carried into the vehicle cabin on the basis of an output signal output from the acceleration sensor 126 as a result of detection of an acceleration by the acceleration sensor 126 (step S1). If it is detected that the mobile terminal 2 has been carried into the vehicle cabin and thus affirmative determination is made in step S1, the signal generating unit 123 generates the carry-on notification signal, and the generated carry-on notification signal is transmitted from the mobile terminal 2 with the use of the notification unit 124 (step S2).

Figure 3:
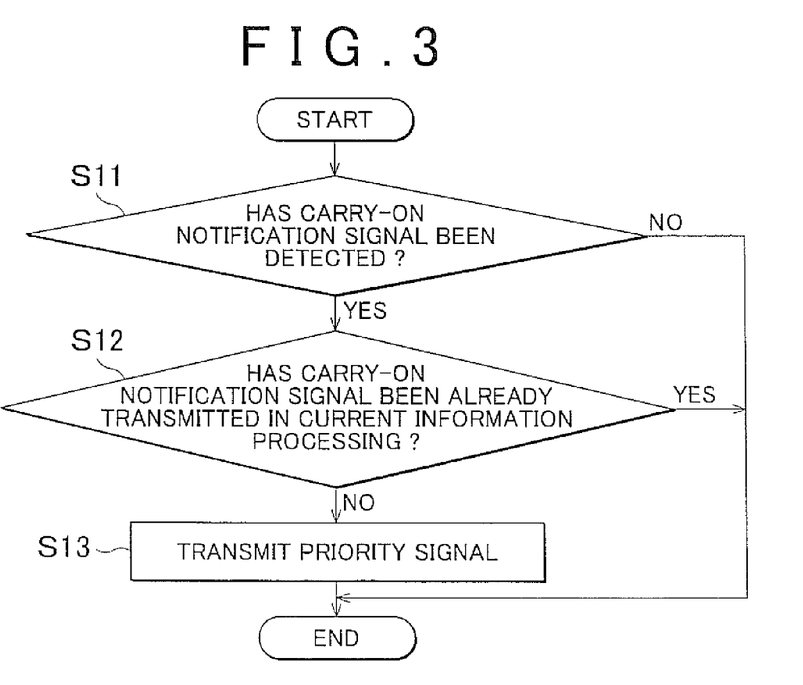
FIG. 3 is a flowchart that illustrates signal transmission processing that is executed if the mobile terminal in the vehicle cabin detects a carry-on notification signal transmitted from another mobile terminal.

Next, information processing that is executed by a mobile terminal 2 in the case where a plurality of the mobile terminals 2 have been carried into the vehicle cabin will be described with reference to FIG. 3. FIG. 3 is a flowchart that shows an example of information processing that is executed by the mobile terminal 2 already present in the vehicle cabin as a result that the other mobile terminal 2 has been carried into the vehicle cabin. In the description here, the mobile terminal 2 that has been already carried in the vehicle cabin is termed the first mobile terminal and the mobile terminal 2 that has been carried into the vehicle cabin after the first mobile terminal is termed the second mobile terminal.

Initially, the signal acquisition unit 121 of the mobile terminal 2 determines whether the carry-on notification signal that is a communication signal transmitted from another mobile terminal 2 and that provides notification that the other mobile terminal 2 has been carried into the vehicle cabin is detected (step S11). For example, it is determined whether the first mobile terminal detects the carry-on notification signal transmitted from the second mobile terminal.

If no carry-on notification signal transmitted from another mobile terminal 2 is detected by the signal acquisition unit 121 and thus negative determination is made in step S11, information processing in this mobile terminal 2 is ended. On the other hand, if the carry-on notification signal transmitted from another mobile terminal 2 is detected by the signal acquisition unit 121 and thus affirmative determination is made in step S11, the determination unit 122 determines whether the mobile terminal 2 has already transmitted the carry-on communication signal in the current information processing (step S12). Specifically, it is determined whether the mobile terminal 2 has transmitted the carry-on notification signal in the current information processing. For example, if the mobile terminal 2 has detected that the host terminal has been carried into the vehicle cabin and transmitted the carry-on notification signal in the last information processing but the mobile terminal 2 has not transmitted the carry-on notification signal in the current information processing, it is determined in step S12 that the carry-on notification signal has not been already transmitted in the current information processing, that is, negative determination is made.

In the mobile terminal 2 according to the first embodiment, the vehicle cabin detection unit 125 determines whether the host terminal has been carried into the vehicle cabin on the basis of an output signal from the acceleration sensor 126. Thus, the first mobile terminal that has been carried into the vehicle cabin in advance of the second mobile terminal has not transmitted the carry-on notification signal at timing close to timing at which the second mobile terminal transmits the carry-on notification signal. Therefore, in the process of step S12, it is determined whether there is a history of transmission of the carry-on notification signal on the basis of information stored in the communication information storage unit 131. In addition, the first mobile terminal may determine whether the carry-on notification signal transmitted from the first mobile terminal itself is a signal that has been already transmitted within a predetermined period of time before the time at which the carry-on notification signal transmitted from the second mobile terminal is detected.

If the mobile terminal 2 has already transmitted the carry-on notification signal in the current information processing and thus affirmative determination is made in step S12, information processing in the mobile terminal 2 is ended. On the other hand, if the mobile terminal 2 has not transmitted the carry-on notification signal in the current information processing and thus negative determination is made in step S12, the signal generating unit 123 generates the priority signal that notifies that the mobile terminal 2 has been already present in the vehicle cabin (the mobile terminal 2 has been already present in the vehicle cabin before the other mobile terminal 2 is present in the vehicle cabin), and the notification unit 124 transmits the generated priority signal via the communication unit 100 (step S13). In addition, a transmission history of the priority signal transmitted by the notification unit 124 is stored in the communication information storage unit 131.

Figure 4:
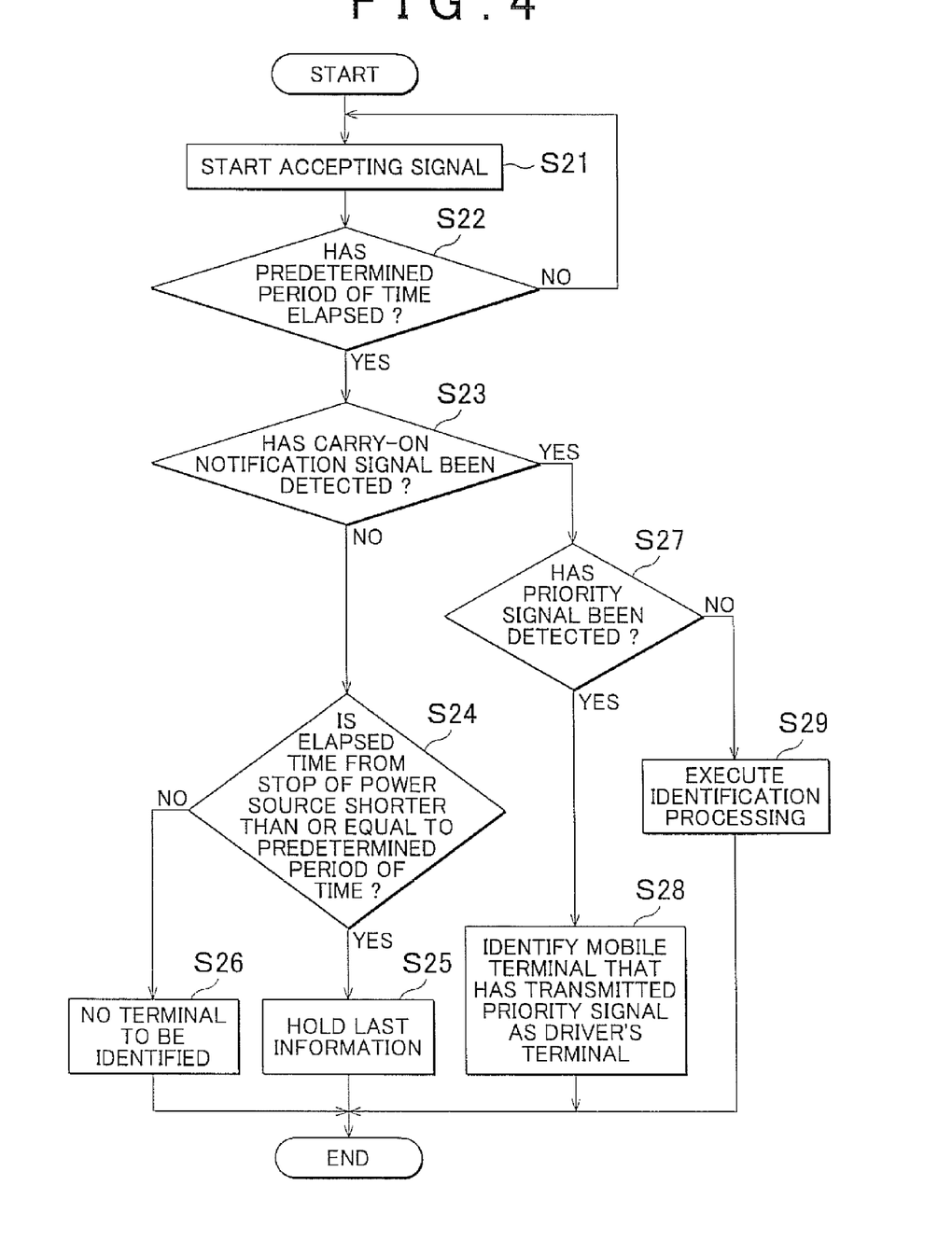
FIG. 4 is a flowchart that illustrates identification processing that is executed if an information identification device detects a signal transmitted from the mobile terminal.

Next, information processing that is executed by the information identification device 1 that communicates with the mobile terminal 2 will be described with reference to FIG. 4. FIG. 4 is a flowchart that shows an example of information processing that is executed by the information identification device 1. Initially, in the information identification device 1, on the basis of the fact that the detection unit 48 detects a signal output from the sensor 3 as a result of detection of opening and closing of the vehicle door, the signal acquisition unit 41 starts accepting a communication signal that is transmitted from the mobile terminal 2 (step S21). The communication signal that is accepted in the process of step S21 includes the carry-on notification signal and the priority signal. In addition, information about the communication signal acquired by the signal acquisition unit 41 is stored in the communication information storage unit 51. Furthermore, an elapsed time from time at which the signal acquisition unit 41 starts accepting a communication signal is measured by the timer unit 46. Then, the signal acquisition unit 41 determines whether a predetermined period of time has elapsed from the start of accepting a communication signal (step S22). If the predetermined period of time has not elapsed from the start of accepting a communication signal and thus negative determination is made in step S22, the process is returned to step S21.

If the predetermined period of time has elapsed from the start of accepting a communication signal and thus affirmative determination is made in step S22, accepting a communication signal that is transmitted from the mobile terminal 2 is ended, and it is determined whether the signal determination unit 42 detects the carry-on notification signal (step S23). Specifically, the signal determination unit 42 determines whether the carry-on notification signal is detected on the basis of the reception information stored in the communication information storage unit 51 as a reception history by the signal acquisition unit 41.

If no carry-on notification signal is detected and thus negative determination is made in step S23, it is determined whether an elapsed time from time at which the power source of the vehicle is stopped is shorter than or equal to the predetermined period of time (step S24). Specifically, when a stop of the power source is detected by the power source state detection unit 47, time at which the stop of the power source is detected is stored in the vehicle information storage unit 53. For example, in the vehicle that uses the internal combustion engine as the power source, when the key inserted in the main switch unit is turned and the internal combustion engine is stopped, the power source state detection unit 47 detects the operation of the main switch unit or the stop of the power source. Then, it is determined whether an elapsed time from time at which the stop of the power source is detected to present time or time of the start of accepting a signal in step S21 is shorter than or equal to the predetermined period of time.

If an elapsed time from a stop of the power source is shorter than or equal to the predetermined period of time and thus affirmative determination is made in step S24, the information identification unit 43 holds information that is identified as the current driver's mobile terminal (step S25). That is, in the process of step S25, no new driver's mobile terminal is identified through the current identification processing, and information about the mobile terminal 2 that is stored in the driver information storage unit 52 as the current driver's mobile terminal is kept. In other words, the last information that is stored in the driver information storage unit 52 is held. Specifically, the information that is stored in the driver information storage unit 52 includes information for identifying the current driver, for example, the driver flag, and the driver flag is held the same as the last value.

In addition, if an elapsed time from a stop of the power source is longer than the predetermined period of time and thus negative determination is made in step S24, the information identification unit 43 determines that there is no mobile terminal 2 that should be identified as the driver's mobile terminal in the current identification processing, and does not identify the driver's mobile terminal (step S26). For example, when the driver information in which the driver flag is on is stored in the driver information storage unit 52, it is configured such that the driver flag is cancelled (set to an off state) by the information identification unit 43.

Furthermore, if the carry-on notification signal has been detected and thus affirmative determination is made in step S23, the signal determination unit 42 determines whether the priority signal is detected (step S27). Specifically, the signal determination unit 42 determines whether the communication signal acquired through current accepting process and stored in the communication information storage unit 51 includes the priority signal. if the priority signal is detected and thus affirmative determination is made in step S27, the information identification unit 43 identifies the mobile terminal 2 that has transmitted the priority signal as the driver's mobile terminal (step S28). Specifically, the information identification unit 43 stores information about the mobile terminal 2, identified as a new driver's mobile terminal through the current identification processing, in the driver information storage unit 52. That is, in the process of step S28, information about the driver flag for identifying the driver is updated by the information identification unit 43.

In addition, if no priority signal is detected and thus negative determination is made in step S27, the process of identifying the driver's mobile terminal from among the mobile terminals 2 that have transmitted the carry-on notification signal on the basis of the acquired carry-on notification signals is executed (step S29). In the process of step S29, the detection unit 48 detects output signals output from the pressure sensor, the door open/close sensor, and the like, included in the sensor 3, and the information identification unit 43 identifies the driver's mobile terminal on the basis of the carry-on notification signal and those detected signals. Note that an electronic control unit that executes the process of step S29 functions as a second identification unit.

As described above, even when the mobile terminal 2 is configured to transmit the carry-on notification signal as a result of detection of the fact that the host terminal has been carried into the vehicle cabin, the mobile terminal 2 is configured to further transmit the priority signal on the basis of the carry-on notification signal transmitted from another mobile terminal 2, so the information identification device 1 is able to recognize the mobile terminal 2 that has been carried in the vehicle cabin. Furthermore, the information identification device 1 is configured to acquire the carry-on notification signal and the priority signal, so it is possible to recognize the sequence in which a plurality of the mobile terminals 2 have been carried into the vehicle cabin.

In addition, according to the above-described embodiment, the first notification signal is transmitted on the basis of the fact that the acceleration sensor of the mobile terminal detects an acceleration, so the mobile terminal is able to actively provide notification to another device that the host terminal has been carried into the vehicle cabin. In addition, the mobile terminal that has been already carried in the vehicle cabin is not able to transmit the first notification signal; however, the mobile terminal is able to transmit the second notification signal as a result of detection of the first notification signal transmitted from another mobile terminal. Therefore, the information identification device is able to further reliably recognize the mobile terminal present in the vehicle cabin. Thus, it is possible to improve the accuracy of identifying the driver's mobile terminal.

In addition, according to the above-described embodiment, it is possible to detect that the driver has been seated on the driver seat on the basis of the signal of the pressure sensor provided at the driver seat, and it is possible to identify the driver's mobile terminal on the basis of the output signal of the pressure sensor and the first notification signal of the mobile terminal. For example, it is possible to identify the driver' mobile terminal on the basis of an interval between time at which the pressure signal has been detected and time at which the first notification signal has been detected, and it is possible to improve the identification accuracy.

Figure 5:
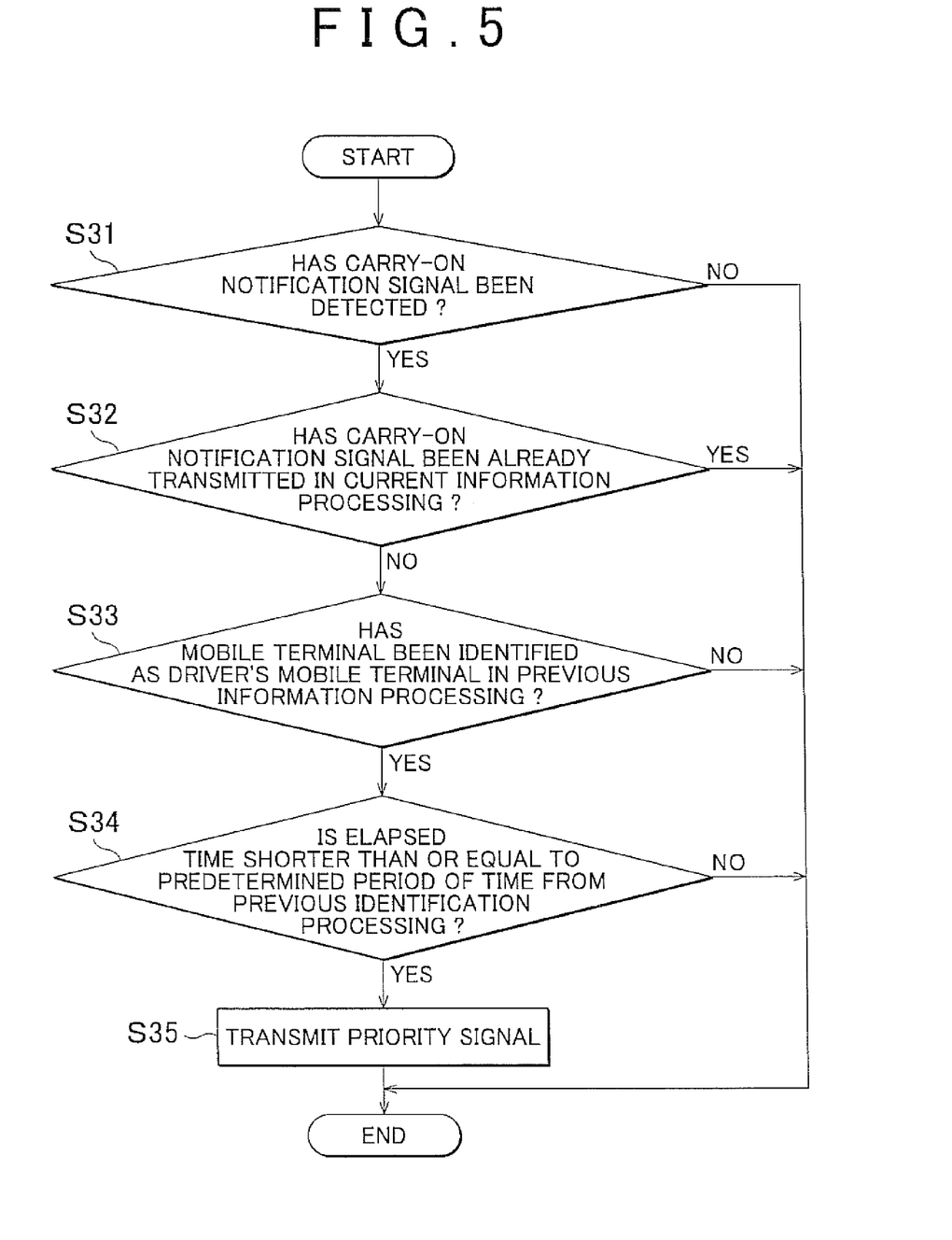
FIG. 5 is a flowchart that shows an alternative embodiment of the signal transmission processing that is executed in the mobile terminal.

Next, an alternative embodiment of information processing that is executed by the mobile terminal 2 already present in the vehicle cabin will be described with reference to FIG. 5. In this alternative embodiment, it is determined whether to transmit the priority signal on the basis of communication information that is stored in the communication information storage unit 131 of the mobile terminal 2. FIG. 5 is a flowchart that shows an alternative embodiment of information processing that is executed by the mobile terminal 2. In addition, step S31 and step S32 in FIG. 5 are respectively similar to step S11 and step S12 in FIG. 3. The description of components similar to those described in the above first embodiment is omitted.

If the mobile terminal 2 has not transmitted the carry-on notification signal in the current information processing and thus negative determination is made in step S32, the determination unit 122 determines whether the mobile terminal 2 has been identified as the driver's mobile terminal before (step S33). At the time when the mobile terminal 2 has been identified as the driver's mobile terminal, an identification notification signal that provides notification that the mobile terminal 2 has been identified as the driver's mobile terminal is transmitted from the information identification device 1 to the mobile terminal 2. Then, in the mobile terminal 2, upon reception of the identification notification signal, history information that the host terminal has been identified as the driver's mobile terminal is stored in the storage unit. That is, in the process of step S33, the determination unit 122 determines whether there is history information that the host terminal has been identified as the driver's mobile terminal. In other words, the determination unit 122 determines whether the mobile terminal 2 has been identified as the driver's mobile terminal previous time. The identification notification signal is transmitted to the address of the mobile terminal 2 that has been identified as the driver's mobile terminal. Thus, the identification notification signal cannot be detected by the mobile terminal 2 that has not been identified as the driver's mobile terminal. The previous time described here means information processing before the current time, and the last time means information processing just before the current time.

If there is history information that the mobile terminal 2 has been identified as the driver's mobile terminal previous time and thus affirmative determination is made in step S33, the determination unit 122 determines whether an elapsed time from the previous identification processing is shorter than or equal to a predetermined period of time (step S34). For example, the determination unit 122 determines whether an elapsed time from time at which the identification notification signal has been received previous time to current time is shorter than or equal to the predetermined period of time.

Then, if an elapsed time from the previous identification processing is shorter than or equal to the predetermined period of time and thus affirmative determination is made in step S34, the signal generating unit 123 generates the priority signal, and the generated priority signal is transmitted by the notification unit 124 via the communication unit 100 (step S35). In addition, information about a transmission history of the priority signal is stored in the communication information storage unit 131. Furthermore, the notification unit 124 outputs, to the informing unit 110, information that the priority signal has been transmitted, and informs the user of the mobile terminal 2 of the information via the informing unit 110. Information that the priority signal has been transmitted may be informed to the user by outputting text information on an image display unit or may be output from the speaker by sound.

On the other hand, if no carry-on notification signal is detected and thus negative determination is made in step S31, if the carry-on notification signal has been already transmitted from the mobile terminal 2 in the current processing and thus affirmative determination is made in step S32, if the mobile terminal 2 has not been identified as the driver's mobile terminal in the previous processing and thus negative determination is made in step S33, or if the predetermined period of time has elapsed from the previous identification processing and thus negative determination is made in step S34, information processing in the mobile terminal 2 is ended.

According to the above-described embodiment, information about the history that indicates that the mobile terminal has been identified as the driver's mobile terminal in the past is stored in the information identification device, and it is possible to identify the driver's mobile terminal in the current identification processing on the basis of the information about the history. Therefore, it is possible to accurately identify the mobile terminal of the driver who usually uses the same vehicle. In addition, when the information that is stored in the information identification device includes information by which it is possible to calculate a time interval from the last identification processing, it is possible to determine whether to keep the driver information identified through the last identification processing.

Figure 6:
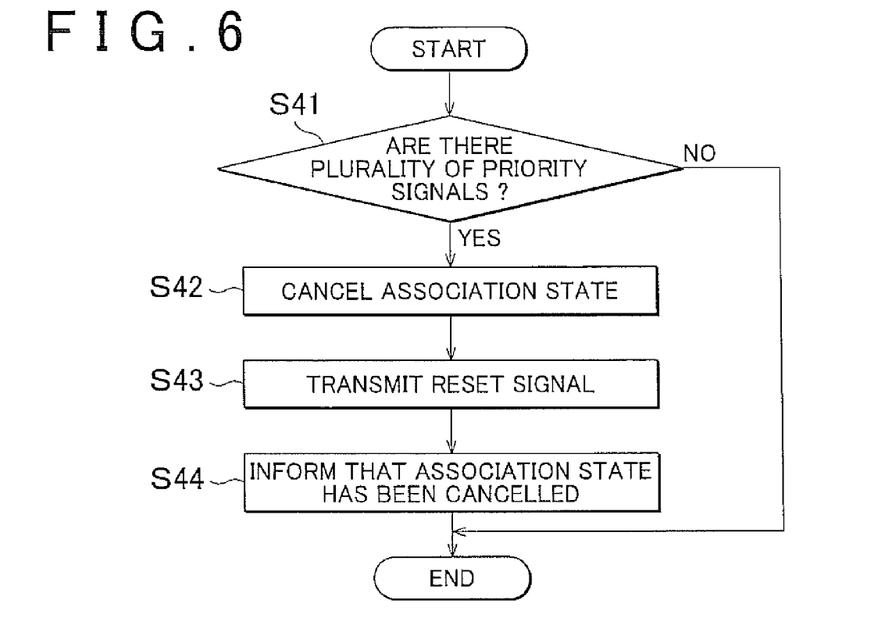
FIG. 6 is a flowchart that illustrates association cancellation processing that is executed in the information identification device.

Next, an alternative embodiment of information processing that is executed by the information identification device 1 will be described with reference to FIG. 6. In this alternative embodiment, processing that is executed by the information identification device 1 in the case where a plurality of the priority signals have been transmitted from the mobile terminal 2 will be described. The description of components similar to those described in the above embodiments is omitted. The signal determination unit 42 of the information identification device 1 determines whether the communication signal acquired by the signal acquisition unit 41 includes a plurality of the priority signals (step S41). If no priority signal is detected or one priority signal is acquired and thus negative determination is made in step S41, the information processing is ended.

On the other hand, if a plurality of the priority signals is acquired by the signal acquisition unit 41 and thus affirmative determination is made in step S41, the information identification unit 43 cancels a current association state (step S42). Specifically, the information identification unit 43 cancels the association state by updating the information that is stored in the driver information storage unit 52. For example, the information identification unit 43 cancels the association state by changing a flag that indicates an associated state where the mobile terminal is associated as the current driver to a flag that indicates a non-association state. Alternatively, the information identification unit 43 cancels the association state by deleting the driver flag from the current driver field.

Then, the signal generating unit 44 generates a reset signal that provides notification that the association state has been cancelled, and the generated reset signal is transmitted by the notification unit 45 via the communication unit 10 (step S43). In addition, the notification unit 45 outputs information that the association state has been cancelled to the informing unit 30, and informs the occupants of that information by the informing unit 30 (step S44). For example, when an image display unit or a speaker is provided as the informing unit 30, information that the association state has been cancelled is informed to the occupants in the vehicle cabin by outputting image data or outputting sound data.

Figure 7:
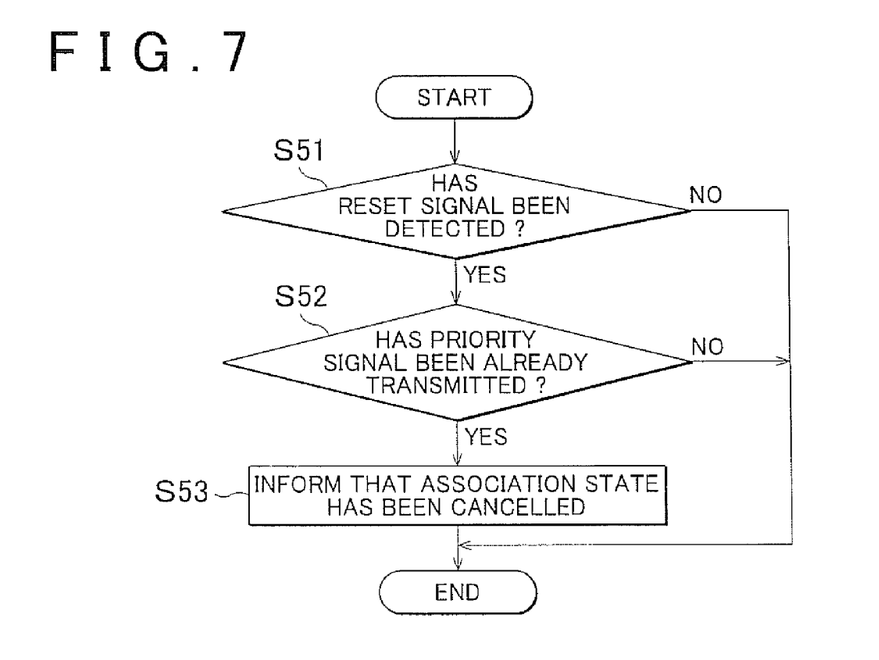
FIG. 7 is a flowchart that illustrates notification processing that is executed if the mobile terminal detects a reset signal.

Next, information processing that is executed by the mobile terminal 2 on the basis of detection of the reset signal transmitted from the information identification device 1 will be described with reference to FIG. 7. FIG. 7 shows information processing that is executed by the mobile terminal 2. After the signal acquisition unit 121 of the mobile terminal 2 starts accepting a communication signal transmitted from the information identification device 1, the determination unit 122 determines whether the reset signal is detected by the signal acquisition unit 121 (step S51). If the reset signal is detected and thus affirmative determination is made in step S51, the determination unit 122 determines whether the mobile terminal 2 has already transmitted the priority signal (step S52). Specifically, the determination unit 122 determines whether the mobile terminal 2 has already transmitted the priority signal on the basis of the information about a communication history, which is stored in the communication information storage unit 131.

If the priority signal has been already transmitted and thus affirmative determination is made in step S52, the notification unit 124 outputs information that the association state has been cancelled to the informing unit 110, and the informing unit 110 informs the information to the user of the mobile terminal 2 (step S53). For example, when the informing unit 110 includes an image display unit, a speaker, or the like, information that the association state has been cancelled is informed to the user by image data or sound data.

Figure 8:
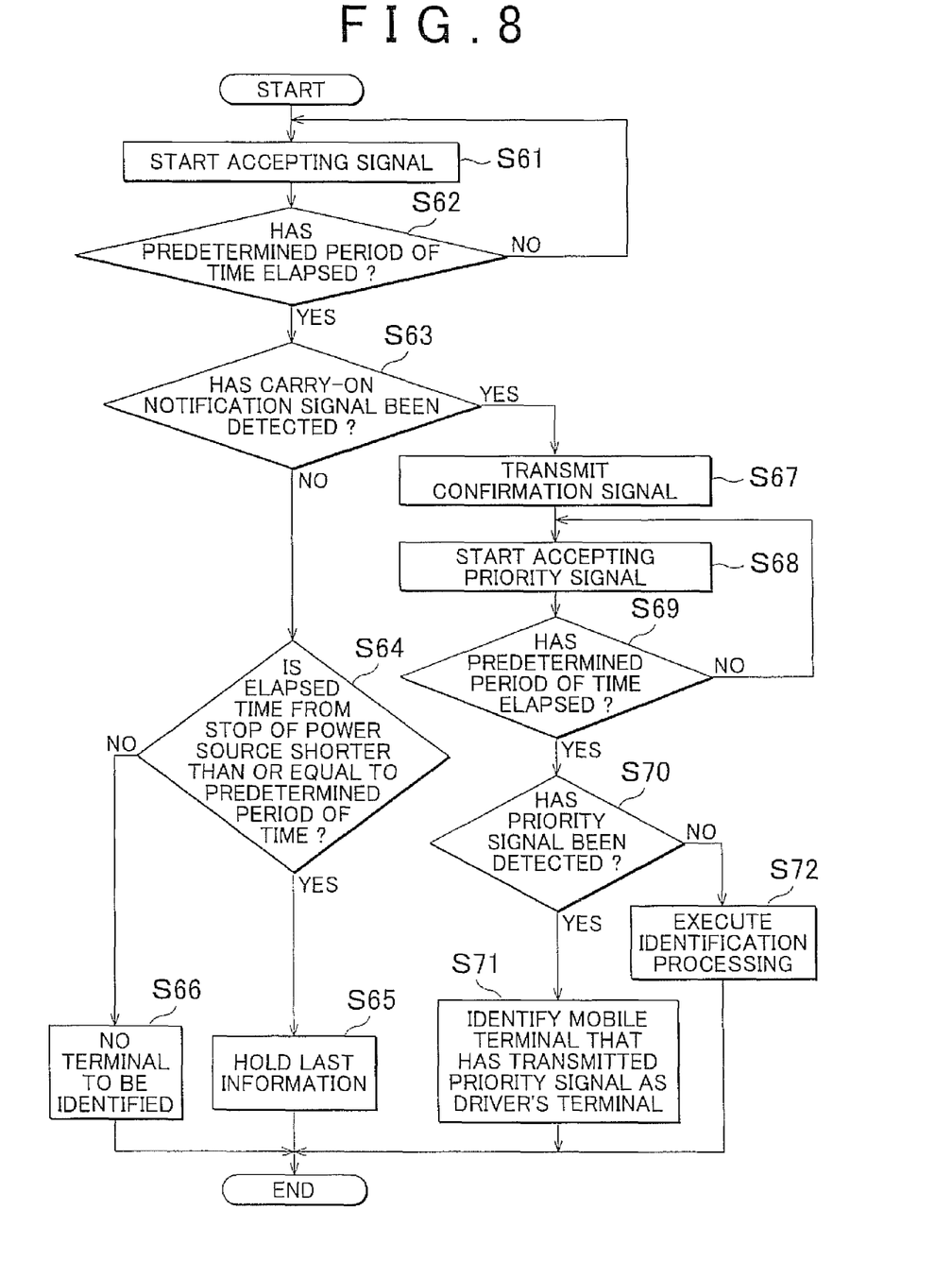
FIG. 8 is a flowchart that illustrates identification processing that is executed if an information identification device detects a signal transmitted from a mobile terminal according to a second embodiment.

Next, an information identification system according to a second embodiment of the invention will be described with reference to the accompanying drawings. In the second embodiment, the information identification device 1 transmits a confirmation signal on the basis of detection of the carry-on notification signal transmitted from the mobile terminal 2. FIG. 8 is a flowchart that shows information processing that is executed by the information identification device 1 according to the second embodiment. In the second embodiment, the description of components similar to those described in the above first embodiment is omitted. Step S61 to step S66, and step S70 to step S72 illustrated in FIG. 8 are respectively similar processes to those of step S21 to step S25, and step S27 to step S29 illustrated in FIG. 4.

If the carry-on notification signal is detected and thus affirmative determination is made in step S63, the signal generating unit 44 of the information identification device 1 generates the confirmation signal that requires the mobile terminal 2 for a response, and the notification unit 45 transmits the confirmation signal via the communication unit 10 (step S67). Then, when the confirmation signal is transmitted, the signal acquisition unit 41 starts accepting the priority signal (step S68). In addition, it is determined whether a predetermined period of time has elapsed from time of the start of accepting the priority signal (step S69). If the predetermined period of time has not elapsed from time of the start of accepting the priority signal and thus negative determination is made in step S69, the process is returned to step S69.

Figure 9:
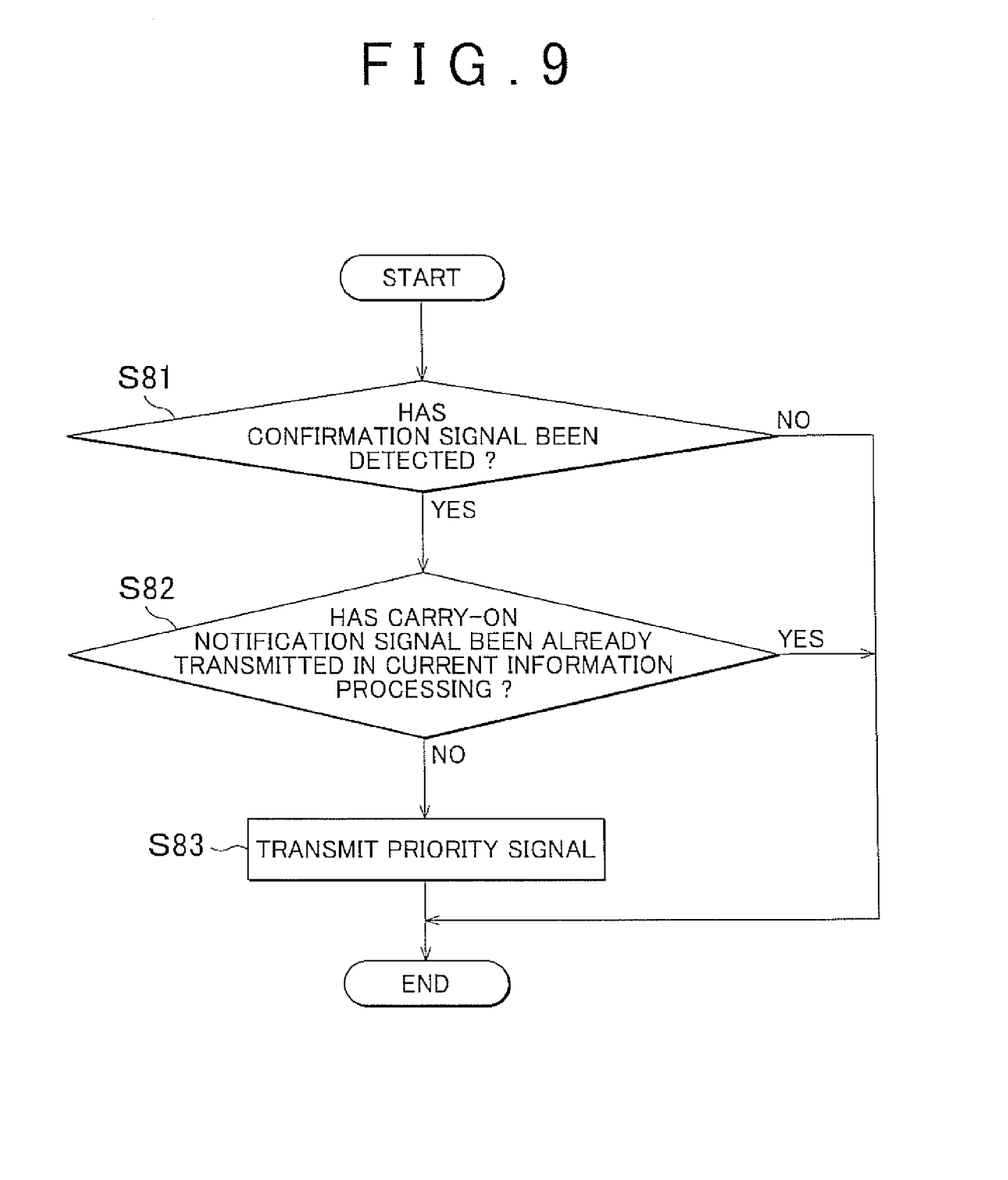
FIG. 9 is a flowchart that illustrates signal transmission processing that is executed in the mobile terminal according to the second embodiment.

Next, information processing that is executed by the mobile terminal 2 on the basis of detection of the confirmation signal transmitted from the information identification device 1 in the second embodiment will be described with reference to FIG. 9. FIG. 9 is a flowchart that shows an example of information processing that is executed by the mobile terminal 2 that detects the confirmation signal. Information processing described here is an alternative embodiment of the information processing described above with reference to FIG. 3. The determination unit 122 of the mobile terminal 2 determines whether the signal acquisition unit 121 detects the confirmation signal transmitted from the information identification device 1 (step S81). If the confirmation signal is detected and thus affirmative determination is made in step S81, the process proceeds to step S82. The processes of step S82 and step S83 illustrated in FIG. 9 are similar to the processes of step S12 and step S13 illustrated in FIG. 3, so the description is omitted.

According to the above-described embodiment, the mobile terminal is configured to transmit the second notification signal as a result of detection of the confirmation signal, which is transmitted from the information identification device as a result of detection of the first notification signal. That is, it is configured such that the second notification signal is transmitted from the mobile terminal in response to the communication signal transmitted from the information identification device. Therefore, the information identification device is configured to be able to recognize the mobile terminal that is carried into the vehicle cabin by determining whether there is a response to the transmitted confirmation signal.

Figure 10:
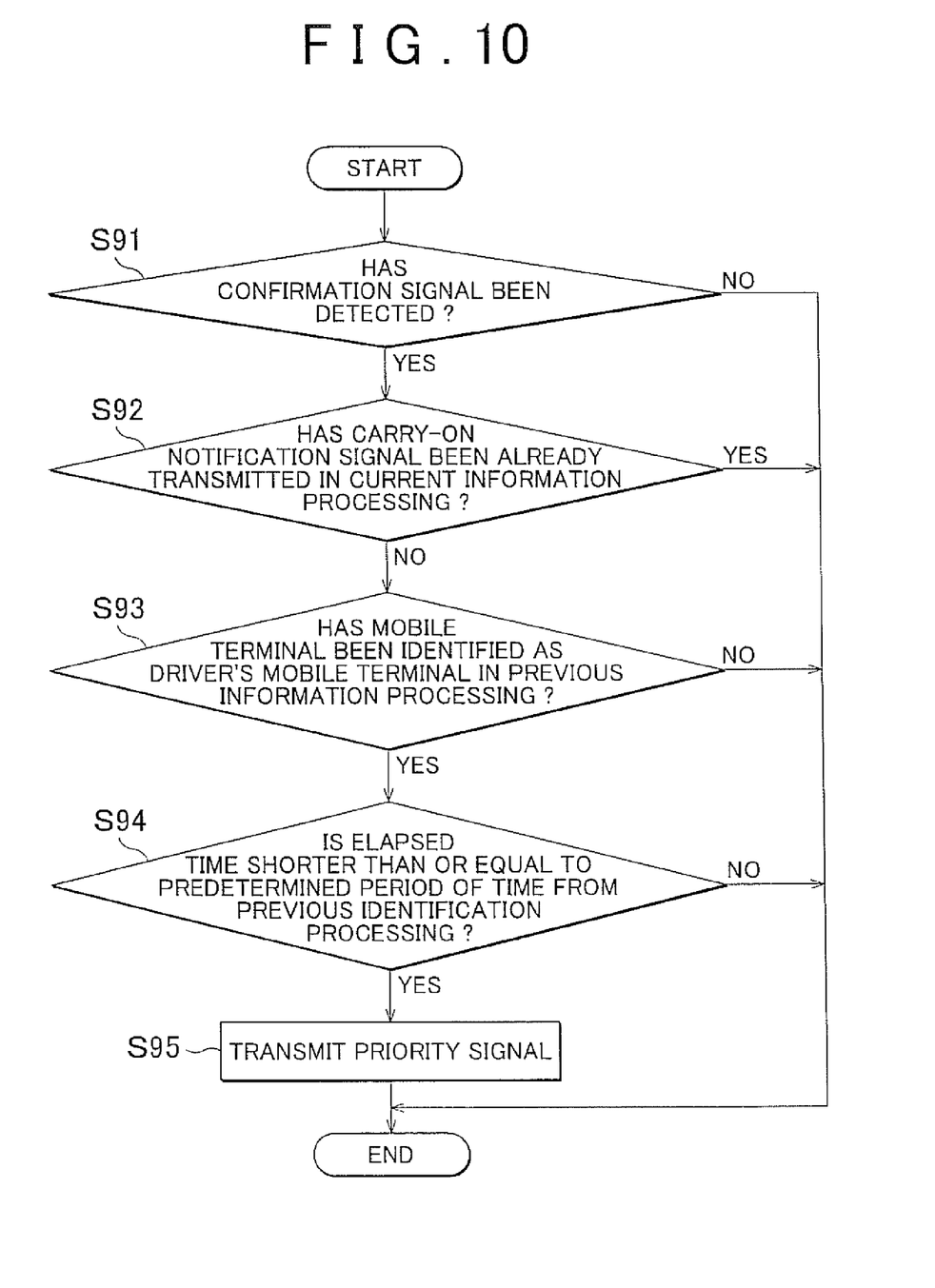
FIG. 10 is a flowchart that shows an alternative embodiment of the signal transmission processing that is executed in the mobile terminal according to the second embodiment.

Next, an alternative embodiment of information processing that is executed by the mobile terminal 2 on the basis of detection of the confirmation signal transmitted from the information identification device 1 will be described with reference to FIG. 10. FIG. 10 is a flowchart that shows the alternative embodiment of information processing that the mobile terminal 2 transmits the priority signal. Information processing described here is an alternative embodiment of the information processing described above with reference to FIG. 5. The determination unit 122 of the mobile terminal 2 determines whether the signal acquisition unit 121 detects the confirmation signal transmitted from the information identification device 1 (step S91). If the confirmation signal is detected and thus affirmative determination is made in step S91, the process proceeds to step S92. The processes of step S92 to step S95 illustrated in FIG. 10 are similar to the processes of step S32 to step S35 illustrated in FIG. 5, so the description is omitted.

The vehicle that is allowed to employ the information identification system according to the invention includes, in addition to an automobile, a ship, a train, a plane, and the like. In addition, the information identification device may be a device mounted on the vehicle, may be a device provided outside the vehicle, and may be configured to be able to wirelessly communicate with a sensor mounted on the vehicle. That is, the information identification device may be configured to identify information about the vehicle on which the sensor is mounted on the basis of the communication signal transmitted from the sensor. Furthermore, the pressure sensor may be provided at each of a driver seat and a front passenger seat.

What is claimed is:

1. An information identification system comprising:
  at least one mobile terminal including:
    a sensor configured to detect that a mobile host terminal has been carried into a vehicle cabin;
    a mobile transmitter;
    a mobile central processing unit having memory coupled to the mobile central processing unit, the memory stores instructions that, when executed by the central processing unit, causes the at least one mobile terminal to perform at least the following:
    transmit a first notification signal, from the mobile transmitter, that provides notification that the mobile host terminal has been carried into the vehicle cabin when the sensor detects that the mobile host terminal has been carried into the vehicle cabin;
    transmit a second notification signal, from the mobile transmitter, that provides notification that the mobile host terminal has been already present in the vehicle cabin when another first notification signal transmitted from another mobile terminal is detected; and
  a transceiver configured to wirelessly communicate with the at least one mobile terminal; and
  a central processing unit having memory coupled to the central processing unit, the memory stores instructions that, when executed by the central processing unit, causes the system to perform at least the following:
    identify the mobile terminal that has transmitted the detected second notification signal as a driver's mobile terminal when the second notification signal is detected.

2. The information identification system according to claim 1, wherein:
  the sensor is configured to detect that the mobile terminal has been carried into the vehicle cabin on the basis of an output signal from an acceleration sensor included in the mobile terminal; and
  the mobile transmitter is configured to transmit the second notification signal when the mobile host terminal has not transmitted the first notification signal and the first notification signal transmitted from the another mobile terminal in current information processing is detected.

3. The information identification system according to claim 2, wherein the mobile transmitter is configured to transmit the second notification signal based on whether the mobile host terminal has been identified as the driver's mobile terminal in previous information processing, when the mobile host terminal has not transmitted the first notification signal and the first notification signal transmitted from the another mobile terminal in the current information processing is detected.

4. The information identification system according to claim 3, wherein the mobile transmitter is configured to transmit the second notification signal, when the mobile host terminal has been identified as the driver's mobile terminal in the previous information processing and an elapsed time from the previous information processing to the current information processing is shorter than or equal to a predetermined period of time.

5. The information identification system according to claim 1, wherein the central processing unit is configured to identify the driver's mobile terminal on the basis of the first notification signal and history information that indicates that the mobile terminal has been identified as the driver's mobile terminal by the identification unit.

6. The information identification system according to claim 1, wherein:
  the transceiver is configured to, when the first notification signal is detected, transmit a confirmation signal that requires the mobile terminal to respond; and
  the mobile transmitter is configured to, when the confirmation signal is detected, transmit the second notification signal in response to the confirmation signal.

7. The information identification system according to claim 1, further comprising:
  a pressure sensor configured to detect that the driver is seated on a driver seat of a vehicle, wherein the central processing unit is configured to, when the first notification signal is detected and the second notification signal is not detected, identify the driver's mobile terminal on the basis of the first notification signal and a pressure signal that is input from the pressure sensor.

8. An information identification device comprising:
  a central processing unit;
  a transceiver configured to wirelessly communicate with at least one mobile terminal, the at least one mobile terminal including:
    a mobile transmitter; and
    a mobile central processing unit having memory coupled to the mobile central processing unit, the memory stores instructions that, when executed by the mobile central processing unit, causes the at least one mobile terminal to perform at least the following:
    transmit a first notification signal, from the mobile transmitter, that provides notification that a mobile host terminal has been carried into a vehicle cabin and to transmit a second notification signal, from the mobile transmitter, that provides notification that the mobile host terminal has been already present in the vehicle cabin when another first notification signal transmitted from another mobile terminal is detected;
  wherein the central processing unit has memory coupled to the central processing unit, the memory stores instructions that, when executed by the central processing unit, causes the device to perform at least the following:
    identify the mobile terminal that has transmitted the detected second notification signal as a driver's mobile terminal when the second notification signal is detected.

9. An information identification method used in an information identification system including at least one mobile terminal configured to detect that a mobile host terminal has been carried into a vehicle cabin and an information identification device configured to wirelessly communicate with the at least one mobile terminal, the information identification method comprising:
- transmitting, through the at least one mobile terminal, a first notification signal that provides notification that the mobile host terminal has been carried into the vehicle cabin;
- transmitting, through the at least one mobile terminal, a second notification signal that provides notification that the mobile host terminal has been already present in the vehicle cabin when another first notification signal transmitted from another mobile terminal is detected; and
- identifying the mobile terminal that has transmitted a detected second notification signal as a driver's mobile terminal when the second notification signal is detected.

* * * * *